United States Patent [19]

Hechavarria

[11] Patent Number: 4,698,983

[45] Date of Patent: Oct. 13, 1987

[54] MODIFIED COMPRESSOR UNIT

[76] Inventor: Ruben Hechavarria, 1954 NW. 24 Ave., Miami, Fla. 33125

[21] Appl. No.: 872,855

[22] Filed: Jun. 11, 1986

[51] Int. Cl.$^4$ .................. F16N 33/00; F25B 45/00
[52] U.S. Cl. .................... 62/292; 184/1.5; 184/105.1; 141/67; 141/18; 141/65; 222/395
[58] Field of Search .............. 184/1.5, 6.16, 105.1, 184/105.3; 417/DIG. 902; 123/196 R; 62/292, 77, 469; 141/18, 65, 67; 222/395, 401

[56] References Cited

U.S. PATENT DOCUMENTS

| | | | |
|---|---|---|---|
| 1,074,730 | 10/1913 | Morris | 184/1.5 |
| 1,987,649 | 1/1935 | Wertz | 184/1.5 |
| 2,216,360 | 10/1940 | Sweetland | 184/1.5 |
| 2,320,048 | 5/1943 | Parson | 184/1.5 |
| 2,552,749 | 5/1951 | Tabet | 184/1.5 |
| 2,755,969 | 7/1956 | Rainero | 184/1.5 |
| 2,863,301 | 12/1958 | Philipp | 62/469 |
| 2,865,559 | 12/1958 | Gigler | 62/469 |
| 3,289,426 | 12/1964 | Music | 62/292 |
| 3,299,655 | 1/1967 | Rayner | 62/469 |
| 4,378,026 | 3/1983 | Bauer | 184/1.5 |
| 4,420,023 | 12/1983 | Cislak | 184/1.5 |

Primary Examiner—Leonard E. Smith
Assistant Examiner—Jane E. Obee
Attorney, Agent, or Firm—John Cyril Malloy

[57] ABSTRACT

A system for the emptying, replenishing and testing of oil maintained within an oil reservoir of a crank case of a compressor unit having an external casing for purposes of housing the compressor motor wherein the interior of the casing is maintained under a positive pressure due to refrigerant entering the casing as it returns from the evaporator. An access valve is disposed on a free end of a conduit having the opposite end thereof disposed in direct access to oil within the oil reservoir. A valve opening structure, when applied to the access valve will position it in an open or flow allowing position, allowing the oil within the casing to pass through the conduit and out through the access valve due to the positive pressure within the casing. The oil may be replaced by securing a liquid pump in fluid communication to the conduit so as to force the access valve open. Upon the pressurized input, from the pump, oil flows back into the oil reservoir against the internal pressure within the casing.

9 Claims, 4 Drawing Figures

MODIFIED COMPRESSOR UNIT

BACKGROUND OF THE INVENTION

1. Field of the Invention

This invention is directed to a compressor unit having an improvement which allows the removal of oil from an oil reservoir in a crank case on the interior of a casing, pressurized by refrigerant, of the compressor unit for purposes of sampling to determine whether the oil is contaminated or for purposes of removal of the oil and replacement thereof when a fluid pump is secured in a manner to force new oil into the casing against pressure within the interior thereof.

2. Description of the Prior Art

In contemporary air conditioning and refrigeration equipment, a compressor unit is provided which typically includes an electrical power source, fed to a compressor motor, mounted on the interior of a fluid tight casing which also includes an oil reservoir or an oil bath which services the compressor motor within the fluid tight or hermetically sealed casing.

If the compressor motor breaks down, the result is a frequent need to repair or replace the compressor motor and also a contamination of the oil maintained within the oil reservoir of the crank case. Accordingly, the removal or at least sampling of the oil is required to determine whether the oil need be replaced. To replace the oil the casing of the compressor unit must be manually tilted or oriented so that the oil contained within the casing drains through a service or drainage opening provided for this purpose.

It should be readily apparent that the compressor units including the casings are of varying size, frequently weighing many pounds and of course are also bulky and initially installed or positioned in small spaces. Therefore, it is frequently necessary to completely remove the compressor unit, disconnecting any anchoring foundation or the like and positioning the compressor unit at a location where tilting or orienting of the compressor unit is possible.

The U.S. Pat. No. 4,493,618 to Buzek, while directed to a handle for a substantially portable type compressor also discloses an independent drainage aperture or fitting for the removal of oil presumably by orienting the casing or tank in the aforementioned manner to allow oil to drain from the casing.

It should be readily apparent therefore that there is a need in the industry relating to the manufacture and/or modification of compressor units for a structure and facility allowing ready access to the oil within the interior of the hermetically sealed casing to the extent that the oil may be sampled, to determine whether it is contaminated, or completely removed from the interior of the casing if such is found necessary. In addition, it is of great benefit that such structures or facilities could be used in combination with conventional compressor units to allow the regular replenishment of the oil supply within the crank case of the casing once the old or contaminated oil has been removed. In addition, and perhaps most importantly, all of the above features, intended to overcome problems existing in the prior art, should be accomplished without the need for repositioning, tilting, orienting or otherwise disturbing the installed original position of the compressor unit.

SUMMARY OF THE INVENTION

The present invention relates to a modification of a conventional compressor unit of the type used in combination with air conditioning systems and refrigeration systems. The present invention includes a system and structural adaptations of the subject compressor unit to enable the efficient removal of oil from the crank case on the interior of a hermetically sealed casing of a compressor unit which is structured to have the compressor motor therein.

More specifically, the present invention comprises the provision of a conduit means, preferably having an elongated configuration, but specifically structured to include a first end disposed in directly accessible relation to the oil within the oil reservoir of the crank case on the interior of the casing. The opposite or second end of the conduit means is located exteriorly of the casing and comprises an access valve normally structured to assume a closed position to prevent fluid flow from exiting the conduit means through the access valve. It is to be remembered that the interior of the casing is pressurized or maintained under a positive pressure due to the return of the refrigerant to the casing from the evaporator. Accordingly, positioning of the access valve into an open position will result in an automatic forcing of the oil, in direct communication with the first end of the conduit means, directly through the conduit means to exit from the access valve for collection.

In another embodiment of the present invention, an access means, preferably in the form of a valve opening structure or adaptor tool is removably connected directly to the access valve so as to maintain it in an open or fluid flow position. The access means may be secured directly to a service conduit which directs the pressurized flow of oil from the conduit means, through the access valve, and through the service conduit to a collection facility. It should be emphasized at this point that this same structure including the conduit means, access valve, access means and service conduit may be utilized to remove a relatively small amount of oil from the crank case on the interior of the pressurized casing for purposes of sampling the oil to determine whether or not it is contaminated. Oil within the casing structure frequently becomes contaminated when the compressor motor suffers a breakdown or a "burn-out" and thereafter contaminates the system. The installation of a new compressor motor does not solve the problem relating to the existence or maintenance of contaminated oil within the crank case of the casing. To the contrary, a new compressor, after being installed, has direct access to the contaminated oil and when put into operation for a period of time, the new compressor motor will be directly subject to the contaminated oil which could result in a failure of the compressor motor. Accordingly, a feature of the present invention is the ability to remove only a small portion of the oil within the oil reservoir of the crank case for purposes of testing such oil to determine whether the oil within the casing is contaminated. If contaminated, the oil may be completely removed using the present system and structural adaptation to the compressor unit, as set forth in the present invention, without need to remove the compressor unit or casing from its originally installed position and cause a tilting or upside-down orientation of the casing as is commonly now performed in the repair of such compressor units.

Another feature of the present invention includes the connection of the service conduit, to a fluid pump specifically structured to direct selected quantities of new oil into the interior of the casing against the internal pressures therein. To accomplish this, an opposite end of the service conduit is connected directly to the fluid pump and the intake portion of the pump is disposed in fluid communication with a new oil supply. Activation of the pump, for selected strokes being equivalent to selected quantities of oil therefore enables the precise measurement of the quantity of replacement oil forced back into the oil reservoir of the crank case on the interior of the pressurized casing.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
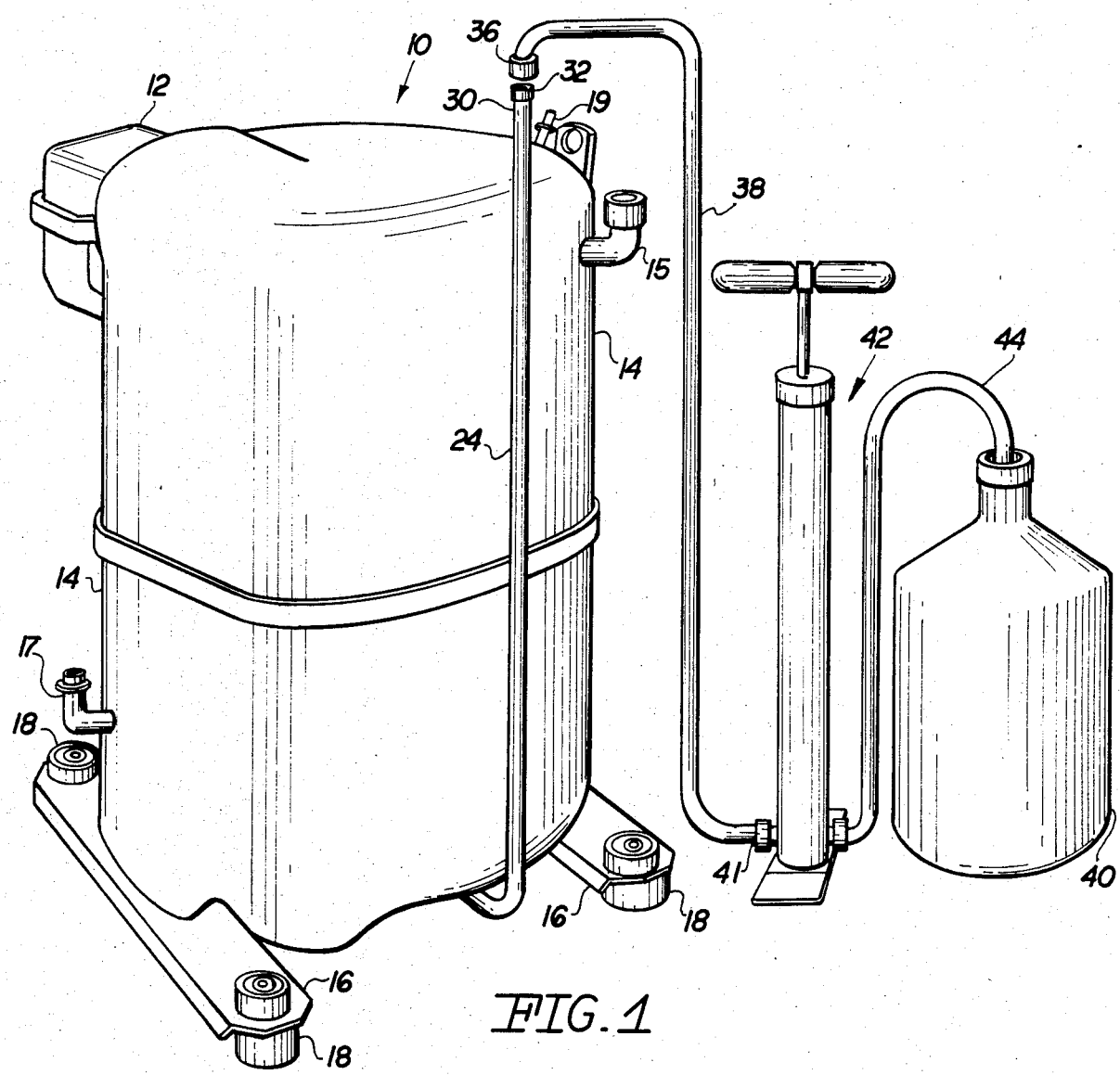
FIG. 1 is an isometric view of a compressor unit showing the exterior features of the casing thereof and the structural feature incorporated in the invention of the present invention.

As shown in FIG. 1, the present invention is directed towards an improvement in a substantially conventional compressor unit indicated as 10 including an electric switching and/or control box 12 mounted on a casing 14. The casing is mounted on a base or foundation pair of struts 16 having shock absorbers and/or combined connector members 18 used to secure the base and accordingly the casing 14 to a floor or like supporting surface.

The casing 14 is of the type which is structured to be fluid tight or hermetically sealed. Therefore, the casing 14 is structured to maintain a positive pressure on the interior thereof due to the incoming refrigerant entering the casing 14 through suction line or coupling 15 as the refrigerant returns from the evaporator (not shown). Further structural features of a conventional design of a compressor unit as generally indicated as 10 includes a discharge coupling 17 through which the refrigerant travels as it passes to the condensor. Also, a service coupling 19 is provided to check the interior refrigerant pressure on the interior of the casing 14. The coupling 19 may be used in combination with a conventional valve structure so that a meter may be applied thereto for the determination of the internal refrigerant pressure within the casing 14 as set forth above. Not shown is the existence of a compressor motor on the interior of the casing. Also, an oil reservoir 20 is located in the lower portion or crank case area of the casing 14 and is structured to include a body of oil 22 used in the functioning of the compressor unit in a conventional fashion.

Figures 2, 3, 4:
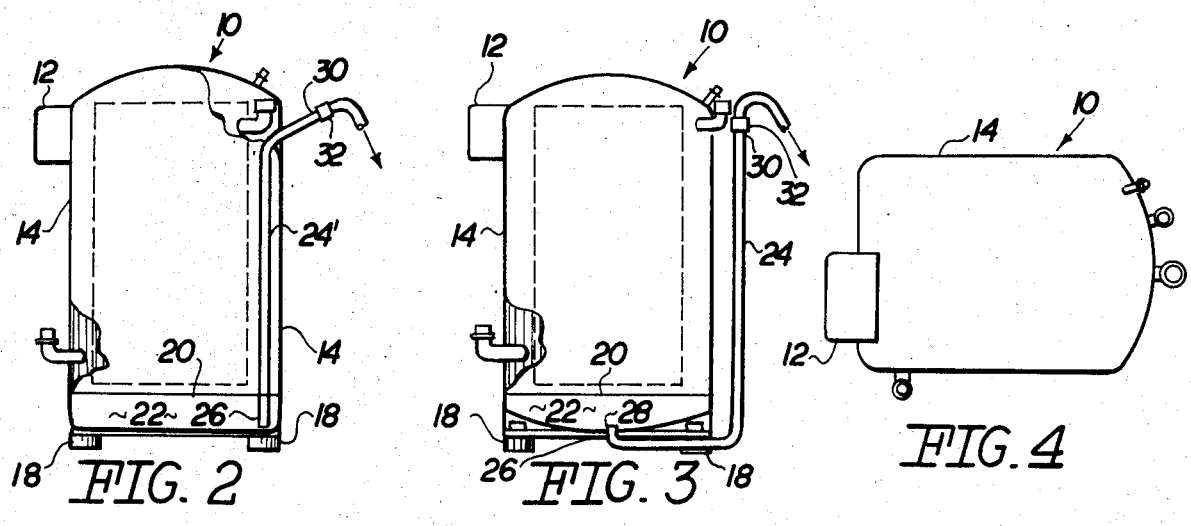
FIG. 2 is a detailed view in partial cutaway of structural features of the compressor unit as modified and improved by the structural components of the present invention.
FIG. 3 is another embodiment differing from the embodiment of FIG. 2.
FIG. 4 is a top plan view of the compressor unit as shown in FIG. 1.

The present invention includes a conduit means 24 which in the embodiment of FIGS. 1 and 3 is located primarily exteriorly of the casing 14 along a major portion of its length. The conduit means 24 includes a first end 26 secured to the casing 14 at a point of entry 28 (see FIG. 3) and in direct access to and in fluid communication with the oil 22 within the oil reservoir 20.

The conduit means 24 includes a second end 30 disposed oppositely from said first end 26 and located exteriorly of the casing 14. An access valve 32 is secured to said second end 30. The access valve 32 may be of substantially conventional design structured to assume a normally closed position so as to prevent fluid flow from exiting the second end 30 of the conduit means 24. However, the access valve 32 is further structured to allow fluid flow in opposite directions therethrough into and out of the conduit means 24 upon being disposed or forced into what may be considered an open position.

A second embodiment of the present invention includes the casing 14 having pressurized refrigerant therein and including oil 22 disposed for collection in an oil reservoir 20 of the crank case on the interior of the casing 14. However, in the embodiment of FIG. 2, the conduit means 24' is located on the interior of the casing 14 along a major portion of its length as it extends from the first end 26 in direct fluid communication or access with the oil 22 to the opposite or second end 30 at which the access valve 32 is mounted. It should be readily apparent that the advantage of FIG. 2 is the ability to conserve space or volume in which the conventional compressor unit 10 may be mounted. It is well recognized in the air conditioning and refrigeration industry that the compressor units are specifically designed to be mounted in relatively small areas. In order to facilitate this positioning, and in certain specific environments, it is much more advantageous to locate the major length of the conduit means 24' within the interior of the casing 14 again as shown in FIG. 2.

With regard to the embodiments of FIGS. 1, 2 and 3, and regardless of the disposition of the conduit means 24 and 24', it should be apparent that the opening of the access valve 32 allows fluid flow through the conduit 24 or 24' and beyond the access valve 32. Due to the maintained positive pressure within the casing 14 and upon opening of the valve 32, the oil is forced, due to the excessive positive pressure within the casing 14, to flow into the first end 26 of the respective conduit means 24 or 24' along the length of the respective conduits and eventually out of the respective conduits through the access valve 32. Therefore, the provision of the structural features as set forth above, eliminates the necessity of tilting, dislodging or otherwise orienting the casing 14, manually, in order to drain the oil from the interior thereof. In addition, the structural features of the present invention further allow certain regulation of fluid flow in the forced exiting of the oil 22 from the interior of the casing 14 in order that only a relatively small amount of oil may be withdrawn for sampling to determine whether such oil is contaminated.

Further structural features of the present invention include the provision of an access means in some form of adaptive tool or element 36 structured for removable engagement with the access valve 32 for the forced opening thereof when the access means 36 and access valve 32 are maintained in an interconnected relation to one another. The access means or adaptive tool or coupling element 36 may also be of substantially conventional structure and design to cooperate with the conventionally structured access valve 32, so as to maintain the access valve 32 in an open position when these two structures are engaged with one another.

In the embodiment of FIG. 1, a service conduit, tubing or hose 38 may be provided in supporting fashion to the access means 36 and used in and of itself to direct the exiting oil from the interior of the casing to any type of collection facility such as a bucket, container or the like. With further reference to FIG. 1, another feature of the present invention is the ability to force new or fresh oil from a supply 40 into the interior of the casing 14, against the internal pressure maintained therein so as to refill or replenish the reservoir 20 with the new oil 22. Such is accomplished by the opposite end 41 of the service conduit 38 being secured to a fluid pump generally indicated as 42. The fluid pump is specifically structured, and also of conventional design, to draw in a selected amount of liquid (oil) from supply 40, through connecting tubing or conduit 44 and, upon a driving stroke being exerted on the pump 42, such selected quantity is forced through the service conduit 38 beyond access means 36, through the open access valve 32, through the length of the conduit 24 or 24' and back into the reservoir 20 as shown in FIGS. 2 and 3.

It is therefore to be understood that the following claims are intended to cover all of the generic and specific features of the invention herein described, and all statements of the scope of the invention which as a matter of language, might be said to fall therebetween.

Now that the invention has been described, what is claimed is:

1. An assembly for the removal and replacement of oil from an oil reservoir of a crank case of a compressor unit used in a refrigerator or air conditioning system, said assembly comprising:
    (a) a casing having a fluid tight construction and including a hollow interior maintained under a positive pressure and housing an oil reservoir therein,
    (b) a conduit means mounted on said casing and having an elongated configuration for establishing fluid communication between oil within said oil reservoir and the exterior of said casing,
    (c) said conduit means including a first end disposed within said hollow interior of said casing in submerged relation to said oil reservoir and in direct access to the oil therein,
    (d) said conduit means including a second end disposed exteriorly of said casing, said conduit means defining a fluid access to said oil reservoir from the exterior of said casing,
    (e) valve means secured to said second end of said conduit means exteriorly of said casing for regulating fluid flow into and out of said casing through said conduit and to and from said oil reservoir,
    (f) said valve means normally oriented in a closed position for maintenance of said positive pressure within said hollow interior of said casing and selectively positionable into an open position,
    (g) access means removably connectable to said valve means for positioning thereof into said open position, said open position allowing a two-way fluid flow through said valve means and said conduit means,
    (h) said access means comprising a valve opening structure removably attachable to said valve means and positioning said valve means in said open position when so attached,
    (i) a portable pump means disposed exteriorly of said casing and connected to said valve opening structure and said pump means further interconnectable between said valve means through said valve opening structure and an oil supply for directing oil from said supply into said casing against said positive pressure therein when said valve means is in said open position, and
    (j) said positive pressure within said hollow interior of said casing forcing oil flow therefrom through said conduit means and said valve means when said valve means is in said open position and unattached to said pump means.

2. An assembly as in claim 1 further comprising at least one service conduit secured at one end thereof to said valve opening structure and connectable at an opposite end thereof to said pump means.

3. An assembly as in claim 2 further comprising a second service conduit secured at one end to said pump means and having an opposite end thereof disposed in fluid communication with an oil supply.

4. An assembly as in claim 1 wherein said conduit means is disposed exteriorly of said casing along a major portion of its length.

5. An assembly as in claim 4 wherein said conduit means is secured to said casing at a point of entry substantially adjacent said first end thereof.

6. An assembly as in claim 5 wherein said point of entry of said conduit means is adjacent a lowest point of said oil reservoir.

7. An assembly as in claim 1 wherein said conduit means is disposed within said casing along a major portion of the length of said conduit means.

8. An assembly as in claim 7 wherein said conduit means is secured to said casing at a point of exit substantially adjacent said second end.

9. An assembly as in claim 8 wherein said point of exit is disposed along an upper portion of said casing, said second end extending outwardly therefrom.

* * * * *